(12) United States Patent
Rossi et al.

(10) Patent No.: US 6,866,712 B1
(45) Date of Patent: Mar. 15, 2005

(54) REINFORCING FIBRE MATERIAL FOR BITUMINOUS AGGREGATES, METHOD FOR PRODUCING SAME AND USE

(75) Inventors: Francesco Rossi, Spotorno (IT); Antonio Ferrante, Milan (IT)

(73) Assignee: Saint-Gobain Vetrotex France S.A., Chambery (FR)

( * ) Notice: Subject to any disclaimer, the term of this patent is extended or adjusted under 35 U.S.C. 154(b) by 0 days.

(21) Appl. No.: 09/926,318

(22) PCT Filed: Apr. 12, 2000

(86) PCT No.: PCT/FR00/00937

§ 371 (c)(1), (2), (4) Date: Jun. 14, 2002

(87) PCT Pub. No.: WO00/61516

PCT Pub. Date: Oct. 19, 2000

(30) Foreign Application Priority Data

Apr. 14, 1999 (IT) .......................................... MI99A0767

(51) Int. Cl.⁷ ...................... C04B 14/42; C09D 195/00; E01C 7/26

(52) U.S. Cl. ........................ 106/489; 106/483; 106/484; 428/366; 428/401

(58) Field of Search ................................. 106/483, 484, 106/489; 428/366, 401

(56) References Cited

FOREIGN PATENT DOCUMENTS

| EP | 0 333 299 | 9/1989 |
|---|---|---|
| EP | 0 462 298 | 12/1991 |
| EP | 0 690 173 | 1/1996 |
| FR | 1 483 687 | 9/1967 |
| FR | 2 718 766 | 10/1995 |
| JP | 62 041399 | 2/1987 |

*Primary Examiner*—David Brunsman
(74) *Attorney, Agent, or Firm*—Oblon, Spivak, McClelland, Maier & Neustadt, P.C.

(57) ABSTRACT

A fibrous reinforcing material (1) is envisaged which is produced from glass filaments (2), advantageously consisting of fragments of glass yarns (3) or of chopped yarns, having a mean diameter of greater than five micrometers and a mean length of greater than six millimeters. The process comprises a selection step (4a, 4b) during which the glass yarns (3) consisting of filaments having a diameter greater than or equal to five micrometers and less than or equal to twenty-four micrometers are chosen, optionally a step (5) of mixing the selected yarns, and a milling step (6) during which the mixed yarns are chopped into filaments (2) having a length of greater than or equal to six millimeters. Advantageously, the fibrous material is in the form of flakes.

20 Claims, 1 Drawing Sheet

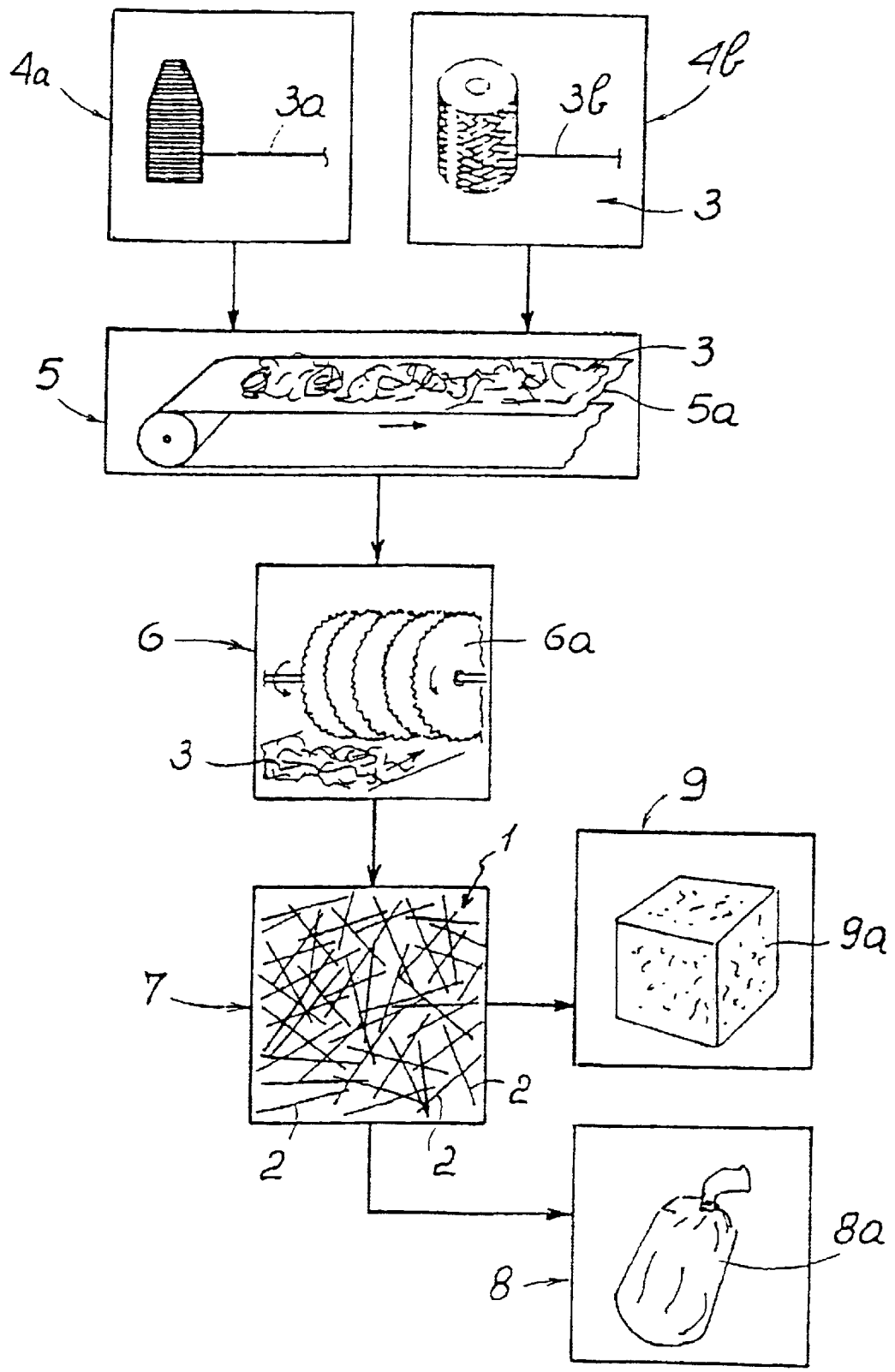

REINFORCING FIBRE MATERIAL FOR BITUMINOUS AGGREGATES, METHOD FOR PRODUCING SAME AND USE

The subject of the present invention is a fibrous reinforcing material for bituminous mixes used for road pavements and a process for producing the said material.

As known, bituminous mixes used for road pavements are mainly mixtures of inert materials and bitumen, also known as asphaltic mixes or agglomerates.

For example, in the case of bituminous mixes of the "draining" or "antiskid" type, the inert materials are mixtures of crushed basaltic stone, sand and calcareous filler.

The bitumen which binds the said inert materials is a mixture of hydrocarbons having a high molecular mass modified so as to have a high viscosity.

Bituminous mixes for road pavements have been the subject of various studies trying to improve their resistance to the applied loads and to the various atmospheric and environmental conditions, such as their permeability or their drainability. The purpose of this is to increase the safety of motorists and to reduce the handling costs.

In particular, it has been endeavoured to increase the quality of these bituminous mixes by introducing various fibres into them.

Potentially, fibres have the capability of improving the resistance of the mixes at least to cracking and to crack propagation, in so far as they can form a kind of microreinforcement which extends through the bitumen.

More particularly, cellulose fibres or in general plant-based fibres, wool fibres, rock fibre or glass wool, and mixtures thereof, have been used.

These experiments have, for various reasons, not given satisfactory results, even if they have provided certain advantages.

For example, plant-based or cellulose fibres are natural materials, but when they absorb water they degrade and bring about a loss of cohesion between the granules of the mixes.

In practice, this phenomenon results in a significant loss of mechanical strength of the mixes during their ageing due to the fact that water is gradually absorbed over time.

Glass wool fibres have a diameter of between approximately less than one and about three thousandths of a millimeter and have a very variable length. Rock wool fibres have the same dimensions—they are obtained by melting mainly sedimentary rocks—and have the feature of being very brittle.

As a whole they undergo no damage due to the presence of moisture, but their size, particularly in the case of fragmentation, may be dangerous to humans and to the environment.

This is because, as the asphalt gradually deteriorates, these fibres, and especially their fragments, spread partly in the air and can come into contact with humans, and even be inhaled, causing various irritations.

Another drawback of these fibres is their tendency not to be spread uniformly in the bituminous mixes, but rather to remain in the substantially surface layers of the latter.

Finally, another drawback of the current technique is the total cost incurred by adding these fibres. In fact, their cost is of the order of a few thousand lira per kilogram of fibre.

Considering that the quantities used are several kilograms of fibre for each tonne of bituminous mix and that a single cubic meter of bituminous mix has a weight of about three tonnes, it will be understood that producing a road pavement like that for a motorway entails a considerable expense because of these fibres.

In short, the technical problem of reinforcing bituminous mixes for road pavements with fibres which are strong, stable and reliable over time, able to be mixed correctly with the mixes, which are not a health hazard and have a relatively low cost remains unsolved.

The technical objective of the present invention is to devise a fibrous reinforcing material and a process for obtaining it which can solve the said technical problem and can substantially remedy the abovementioned drawbacks.

This technical objective is to a large part achieved by means of a fibrous reinforcing material for bituminous mixes used for road pavements, characterized in that it is obtained mostly from glass filaments having a diameter of greater than or equal to five micrometers and a length of greater than or equal to six millimeters.

According to advantageous characteristics:

the material is in the form of flakes;

the said filaments are made of E-type glass consisting essentially of a calcium aluminium borosilicate with a low alkali content;

the material comprises a mixture of glass filaments of different diameters;

the material comprises glass filaments of two different diameters in approximately equal quantities by weight;

the said glass filaments come from chopped glass yarns;

the said filaments have a minimum diameter of greater than or equal to five micrometers and a maximum diameter of less than or equal to twenty-four micrometers;

the said filaments have a mean diameter of between ten and fifteen micrometers;

the said filaments have mainly a so-called minimum length of greater than or equal to six millimeters and a maximum length of less than or equal to twenty millimeters;

the said filaments (2) have a mean length of between ten and twelve millimeters.

The subject of the invention is also a process for manufacturing a fibrous reinforcing material for bituminous mixes used for road pavements, characterized in that it comprises: a selection step in which glass yarns consisting of filaments having a diameter greater than or equal to a minimum diameter of five micrometers and less than or equal to a maximum diameter of twenty-four micrometers are selected; and a milling step during which the said yarns are chopped into filaments having mostly a length of greater than or equal to six millimeters.

According to advantageous characteristics:

in the said milling step, the chopped filaments agglomerate in the form of flakes;

in the said selection step, the said glass yarns are chosen from production scrap or waste;

in the said selection step, yarns made of E-grade glass are chosen;

in the said selection step, "textile" glass yarns and "roving" glass yarns are chosen;

the said yarns are metered in approximately equal quantities by weight;

yarns of different diameters, chosen so as to obtain a mean diameter of between ten and fifteen micrometers are selected;

during the milling step, the said yarns are chopped into filaments having a mean length of between ten and twelve millimeters;

the milling step is carried out using a chopper with rotating blades.

The subject of the invention is also the use of a fibrous material produced as above, in which the said fibrous material is introduced as reinforcing material into bituminous mixes for road pavements.

Finally, the subject of the invention is a bituminous mix for road pavements, of the type comprising bitumen and a mixture of inert materials, characterized in that it contains a fibrous reinforcing material according to the invention.

BRIEF DESCRIPTION OF THE DRAWING

We will now describe, by way of non-limiting example, a preferred embodiment of the invention, illustrated in the appended drawing in which the single FIGURE shows, through a flow diagram, how the novel process for producing the fibrous material according to the invention is carried out.

Referring to the drawing, the reinforcing fibre for bituminous mixes used for road pavements is indicated overall by the reference number 1.

It is produced in a novel way by glass filaments 2 which are essentially in fragments of glass yarns 3, especially of chopped or milled yarns, consisting of filaments having a diameter of greater than five micrometers (thousandths of a millimeter) and having a length of greater than six millimeters.

According to this example, the filaments 2 are all made of E-type glass. It is known that E-type glass has excellent strength properties and a high elastic modulus, together with a high melting point.

In short, it may be defined as a calcium aluminium borosilicate which is characterized by a very low alkali content.

In more detail, the precise composition of the E-glass used for the filaments 2 is as follows:

| | |
|---|---|
| silica ($SiO_2$) | 52–56% by weight; |
| calcium carbonate (CaO) | 16–25% by weight; |
| alumina ($Al_2O_3$) | 12–16% by weight; |
| boron trioxide ($B_2O_3$) | 5–10% by weight; |
| various (MgO, $Na_2O$, $K_2O$, $Fe_2O_3$, $TiO_2$, $ZrO_2$, SrO, $SO_3$, CrO, FeO) | the balance to 100. |

With regard to the dimensions, the filaments 2 have approximately constant diameters of between the said minimum diameter of greater than or equal to five micrometers and a maximum diameter of less than or equal to twenty-four micrometers.

Furthermore, the diameters and the distribution of the filaments are preferably chosen so that the latter have a mean diameter of between ten and fifteen micrometers.

According to another advantageous aspect of the invention, the fibre 1 is a mixture of filaments 2 of different diameters.

In particular, the fibre 1 is a mixture of fragments of two glass yarns 3 of different diameters, and therefore of different flexibility, which are mixed in equal quantities by weight:
50% of yarn called "textile" yarn 3a, made of E-glass having a diameter of less than ten micrometers (the "textile" yarn 3a is relatively fine so as to obtain the maximum flexibility when it is used in textile articles); and
50% of yarn called "roving" yarn 3b, made of E-glass having a diameter of greater than fourteen micrometers (the "roving" yarn 3b has a greater cross section so as to obtain a high strength when it is used to create tubular windings).

In the case of filaments 2 produced with fragments of a single glass yarn 3, the said mean diameter is the preferred diameter.

As explained below, a diameter of greater than five micrometers is chosen in order to avoid the volatility of the filaments. A mean diameter of between ten and fifteen micrometers is advantageous in order to obtain two results, namely a good compromise between flexibility and strength and a good dispersion in the mix.

This is because when a reinforcing fibre is introduced into the bituminous mix the fibre may tend to float if it is too fine or else, conversely, may drop to the bottom if it is too thick.

Dimensions like those of the said mean diameter produce an excellent balance between the said extremes.

In the preferred case of the reinforcing fibre 1 defined by a mixture of filaments 2 coming in equal parts from a "textile" glass yarn 3a and from a "roving" glass yarn 3b, of different diameters, rapid dispersion of the filaments 2 at all levels of bitumen and of bituminous mix is ensured in a novel manner.

As regards length, the filaments 2 have substantially a minimum length of greater than or equal to six millimeters and a maximum length of less than or equal to twenty millimeters.

The filaments 2 preferably have a mean length of between ten and twelve millimeters.

This mean length is particularly advantageous.

This is because it has been demonstrated experimentally that the short lengths increase the volatility of the filaments and give rise to poor cohesion of the bituminous mix. In other words, the reinforcing or binding function for which the fibre exists is reduced.

On the other hand, excessive lengths result either in possible fracture of the filaments or in substantial difficulty in mixing or dispersing the fibres within the bituminous mix.

In contrast, a reinforcing fibre (or material) 1 comprising filaments of the said mean length or in all cases having a length of between the minimum and the maximum length indicated, gives excellent results in terms of ability to provide cohesion, in terms of ease of dispersion and in terms of integrity.

Furthermore, the dimensions indicated above are advantageous in that they allow the filaments to agglomerate or become entangled in the form of flakes which show good dispersion in a bituminous mix.

It should be pointed out that, although it is possible to chose the diameters of the filaments precisely, in the case of the lengths there is always a certain quantity of fragments having unpredictable dimensions.

The invention furthermore comprises a novel process for producing the reinforcing fibre described above.

According to the novel process, it is envisaged in an original manner that the fibrous reinforcing material is made from glass yarns already produced and preferably from production scrap or waste, when this waste is not due to qualitatively essential aspects of the yarns.

Advantageously, the reinforcing material 1 is moreover made from a mixture of several glass yarns of different diameters and consistency, which yarns are checked from the standpoint of their quality and dimensions and contain no foreign matter.

In particular, it is advantageous to start with a mixture of the said "textile" yarn 3a and the said "roving" yarn 3b.

The first steps of the process, illustrated in the figure, are specifically "textile" yarn 3a and "roving" yarn 3b selection steps 4a, 4b, respectively.

The next step of the process then consists of a mixing step 5 for mixing the selected yarns which are placed on a conveyor belt 5a, indicated in the diagram, or which are transported to the successive conversion steps. In the case of yarns 3a, 3b, the mixture may simply comprise equal percentages thereof. In the case of the use of other types of yarn, it is necessary to choose and meter the quantities so that, in the mixing step, the mean diameter of the yarns is between ten and fifteen micrometers, or is close to the optimum value.

In all cases, it is advantageous to select and mix only E-grade glass yarns 3 having diameters greater than a minimum diameter of five micrometers and less than a maximum diameter of twenty-four micrometers.

The yarns, even of greater length, are then reduced into fragments or filaments 2 of length at least mostly greater than a minimum length of six millimeters and less than a maximum length of twenty millimeters.

This operation is carried out in the milling step 6, during which the yarns 3a, 3b are chopped in a chopper 6a with rotating blades, shown schematically by a few blades, or in any other suitable apparatus.

Preferably, the milling is carried out so as to obtain stubs or filaments 2 having a mean length of between ten and twelve centimeters.

The milling of the yarns has the consequence that the chopped filaments 2 agglomerate or become entangled in the form of flakes.

Various other operations may be combined with the milling step 6.

For example, an initial fragmentation of the yarns, if they are received as a compact mass or if they have particularly long lengths, so as to facilitate the following milling step.

It is also opportune to carry out a screening step through a screen with calibrated holes, making it possible to obtain chopping uniformity.

After the milling step 6, the production of the fibrous material 1 is almost complete, as shown schematically in box 7 in which the reference number 2 indicates the filaments thus produced. The material 1 may be stored in a silo or stored in any other appropriate manner.

Before storing the material, it is opportune to carry out an additional step of de-ironing the fibre so as to remove particles of iron which could have been introduced during the manufacturing steps described above, particularly during the milling.

Finally, the figure shows a packing step 8 during which the reinforcing fibre 1 is put, for example, into meltable bags 8a.

It is also envisaged that the material be packaged, as shown in box 9, in the form of large-sized bales 9a obtained using presses or other devices.

The packaging may also be carried out just after milling or before storage.

As already mentioned, the use of the fibre 1 entails incorporating it as a reinforcing material into bituminous mixes for road pavements.

These mixes are essentially a mixture of inert materials and bitumen.

For example, in the case of bituminous mixes of the "draining" or "antiskid" type, the inert materials are mixtures of crushed basaltic stone, sand and a filler, while the bitumen is of the high-viscosity modified type.

In detail, an optimum composition of an "antiskid" mix is as follows:

inert material: 77% crushed basaltic stone, 14% sand, 9% calcareous filler;

high-viscosity modified bitumen: barely 5.5% of the weight of the above inert material.

The fibre 1 is introduced into this mix in a quantity of between two and five percent of the total weight of the inert material.

The invention has major advantages.

Firstly, the fibre obtained, because of its dimensions, its strength and its flexibility, and given that it is an inert material like glass, it is not a health hazard, it cannot be inhaled and it may be disposed of as non-hazardous waste.

Secondly, the fibre forms a fixed reinforcement or three-dimensional network within the mix, with the effect that the volume occupied by the bitumen is increased, the resistance to cracking and the tensile strength are appreciably improved and the shear forces under dynamic loads are absorbed.

These characteristics do not vary over time and the glass proves to be insensitive to the presence of water.

The process also allows these fibres to be produced at a lower cost than that of the known fibres mentioned in our introduction, particularly because the raw material can be obtained from production scrap or waste.

The reliability, the mechanical effectiveness and the reduced cost have the overall consequence that it is possible to reduce the frequency of road pavement repair, or to produce effective courses of reduced thickness, or to increase the pavement area without increasing the total cost.

The reinforcing fibre according to the invention also guarantees that the fibres are uniformly distributed in the mix thanks to its optimum dimensions defined by the said mean diameter and mean length which put it into equilibrium in the bitumen.

In addition, in the preferred case of a fibre consisting of a mixture of filaments of different diameters, rapid mixing and dispersion of the fibre are also obtained in the field indicated: the various filaments are distributed spontaneously and rapidly at all levels of the mix.

The mean length chosen then gives excellent results with regard to the ability to ensure cohesion and integrity: it binds vast portions of mix and does not give rise to filament fragmentation.

Furthermore, the substantially homogeneous network formed by the fibres prevents the bitumen from flowing out of the mix down to the bottom of the tanks of lorries, thus avoiding any loss of this bitumen and any modification of the optimum composition of the mix.

The invention described above in its preferred embodiment is capable of many modifications and variants which all fall within the scope of the inventive concept. Furthermore, all the details may be replaced with technically equivalent elements.

What is claimed is:

1. Fibrous reinforcing material for bituminous mixes for road pavements, obtained mostly from glass filaments having a diameter of greater than or equal to 5 micrometers and a length of greater than or equal to 6 millimeters, wherein said material comprises a mixture of glass filaments of different diameters, arranged in the form of flakes.

2. Fibrous reinforcing material according to claim 1, wherein said filaments are made of E-type glass consisting essentially of calcium aluminum borosilicate with a low alkali content.

3. Fibrous reinforcing material according to claim 1, comprising a mixture of glass filaments of two different diameters in approximately equal quantities by weight.

4. Fibrous reinforcing material according to claim 1, in which said glass filaments come from chopped glass yarns.

5. Fibrous reinforcing material according to claim 1, in which said glass filaments have a minimum diameter of greater than or equal to 5 micrometers and a maximum diameter of less than or equal to 24 micrometers.

6. Fibrous reinforcing material according to claim 5, in which said filaments have a mean diameter of between 10 and 15 micrometers.

7. Fibrous reinforcing material according to claim 1, in which said filaments have mainly a minimum length of greater than or equal to 6 millimeters and a maximum length of less than or equal to 20 millimeters.

8. Fibrous reinforcing material according to claim 7, in which said filaments have a mean length of between 10 and 12 millimeters.

9. Bituminous mix for road pavements, of the type comprising bitumen and a mixture of inert materials, and additionally containing a fibrous reinforcing material according to claim 1.

10. Process for manufacturing a fibrous reinforcing material for bituminous mixes used for road pavements, which process comprises: a selection step in which glass yarns consisting of filaments having a diameter greater than or equal to a minimum diameter of 5 micrometers and less than or equal to a maximum diameter of 24 micrometers are chosen; and a milling step during which said yarns are chopped into filaments having mostly a length of greater than or equal to 6 millimeters, and during which the chopped filaments agglomerate in the form of flakes.

11. Process according to claim 10 in which, in said selection step, said glass yarns are chosen from production scrap or waste.

12. Process according to claim 10 in which, in said selection step, yarns made of E-grade glass are chosen.

13. Process according to claim 10 in which, in said selection step, textile glass yarns and roving glass yarns are chosen.

14. Process according to claim 13, in which said yarns are metered in approximately equal quantities by weight.

15. Process according to claim 10, in which yarns of different diameters, chosen so as to obtain a mean diameter of between 10 and 15 micrometers, are selected.

16. Process according to claim 10 in which, during the milling step, the said yarns are chopped into filaments having a mean length of between 10 and 12 millimeters.

17. Process according to claim 10, in which the milling step is carried out using a chopper with rotating blades.

18. Bituminous mix for road pavements, of the type comprising bitumen and a mixture of inert materials, and additionally containing a fibrous reinforcing material produced according to claim 10.

19. Fibrous reinforcing material for bituminous mixes used for road pavements, obtained mostly from glass filaments having a diameter of greater than or equal to 5 micrometers and a length of greater than or equal to 6 millimeters, which material comprises a mixture of glass filaments of different diameters arranged in the form of flakes obtained by a milling step.

20. Fibrous reinforcing material obtained mostly from a mixture of at least two yarns A and B, each of said yarns consisting of filaments, said mixture having a mean diameter of greater than or equal to 5 micrometers and a length of greater than or equal to 6 meters, wherein the filaments of yarn A have a diameter of less than 10 micrometers, and the filaments of yarn B have a diameter of greater than 14 micrometers.

* * * * *

UNITED STATES PATENT AND TRADEMARK OFFICE
CERTIFICATE OF CORRECTION

PATENT NO.    : 6,866,712 B1
DATED         : March 15, 2005
INVENTOR(S)   : Francesco Rossi et al.

It is certified that error appears in the above-identified patent and that said Letters Patent is hereby corrected as shown below:

<u>Column 5,</u>
Line 25, "centimeters" should read -- millimeters --;

<u>Column 8,</u>
Line 29, "meters" should read -- millimeters --.

Signed and Sealed this

Twenty-first Day of June, 2005

JON W. DUDAS
*Director of the United States Patent and Trademark Office*